A. CROOK.
CENTERING DEVICE.
APPLICATION FILED AUG. 12, 1914.

1,140,123.

Patented May 18, 1915.

Witnesses
Charles H. York.
Will A. Simons

Inventor:-
Alfred Crook.
by his Attorneys
Howson & Howson

UNITED STATES PATENT OFFICE.

ALFRED CROOK, OF PHILADELPHIA, PENNSYLVANIA, ASSIGNOR TO PHILADELPHIA ROLL AND MACHINE COMPANY, OF PHILADELPHIA, PENNSYLVANIA, A CORPORATION OF PENNSYLVANIA.

CENTERING DEVICE.

1,140,123.      Specification of Letters Patent.      Patented May 18, 1915.

Application filed August 12, 1914. Serial No. 856,471.

*To all whom it may concern:*

Be it known that I, ALFRED CROOK, a citizen of the United States, residing in Philadelphia, Pennsylvania, have invented certain Improvements in Centering Devices, of which the following is a specification.

One object of my invention is to provide a relatively simple, substantial and conveniently operative device whereby shafts, rolls or other structures of cylindrical or substantially cylindrical form may be quickly centered in a lathe, the construction of the device being such as to permit of its easy application to lathes without requiring their material alteration.

The invention also contemplates an inexpensive combination of parts which shall accurately accomplish the above noted end.

These objects and other advantageous ends I secure as hereinafter set forth, reference being had to the accompanying drawings in which:—

Figure 1:
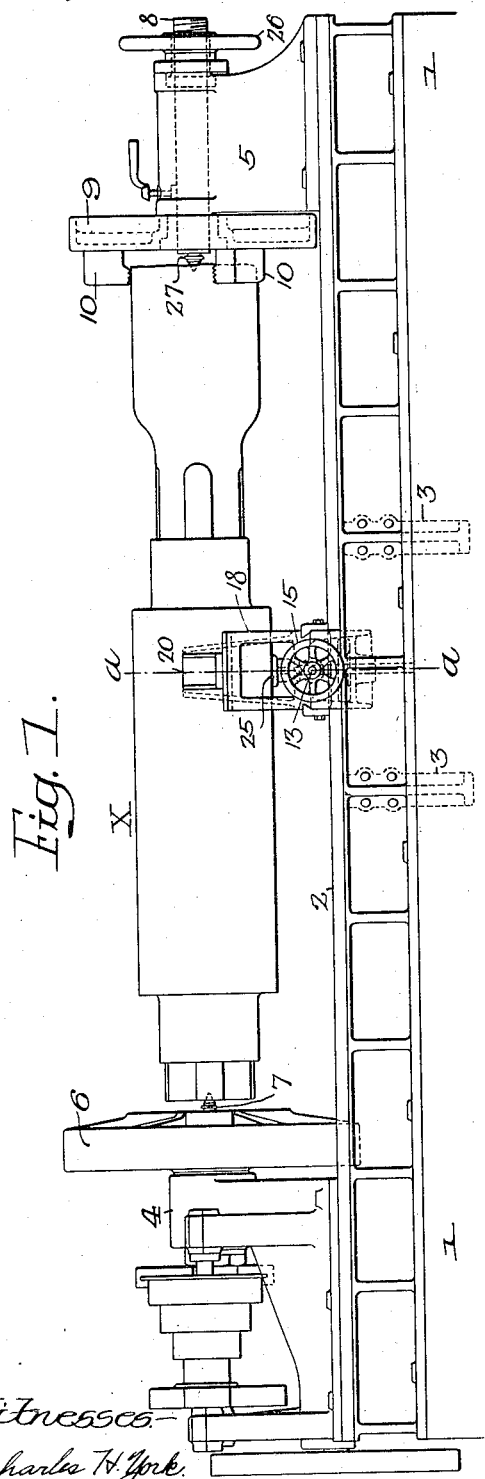
Figure 2:
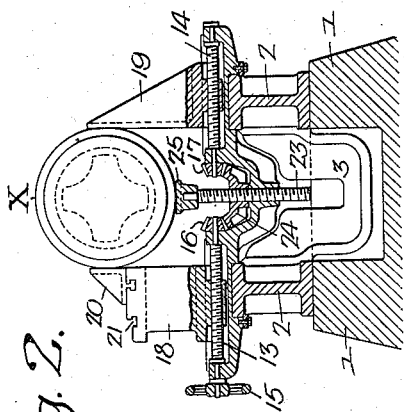

Figure 1 is a side elevation of a lathe showing my invention as applied thereto, and Fig. 2 is a vertical section of the line *a—a*, Fig. 1.

In the above drawings 1 represents the foundation of a lathe particularly designed for turning rolls and on this is mounted the frame work proper which consists of a pair of side members 2 of suitable cross section rigidly connected at intervals by cross-braces 3. On these side members 2 are mounted the head and tail stocks 4 and 5 of the lathe, of which the first is provided with any desired form of driving and change speed mechanism and carries a driving face plate 6 and center 7. The tail stock is likewise provided with a tail-shaft 8 to which is fixed a face plate 9 carrying radially adjustable jaws 10. Any suitable means, forming no part of the present invention, may be employed to cause a roll X to be positively driven from the face plate 6 and any desired form of tool carriage is also provided, but it is omitted from the drawings since it also forms no part of the present invention.

Slidably mounted on the frame members 2 is the centering device which includes a transversely extending frame 12 having recesses for the reception of the top portions of said side members, it being noted that its central portion is depressed between these members. Each side of the frame 12 is provided with bearings for the reception of horizontally threaded shafts 13 and 14 mounted in line with each other and held from longitudinal movement while being freely rotatable. The first of these shafts has fixed to it a hand or operating wheel 15 and a beveled pinion 16, while the second has fixed to it a second beveled pinion 17. The frame 12 adjacent each of the above noted screw shafts is formed to provide guide ways for jaws 18 and 19 having threaded portions for the reception of the shafts 13 and 14 respectively. The adjacent faces of the jaws are made plane and said jaws may be precisely similar though I preferably make the upper part of the first of them in the form of an auxiliary jaw 20 which after the centering has been accomplished may be replaced by any desired form of tool holder or carriage. The auxiliary jaw has a plane face lying in the plane of the main face of the jaw 18, and held in place by a downwardly projecting lug of T-section, which fits within a correspondingly formed groove in the top face of said main jaw which as above noted may also serve as a tool post or support. By means of this lug-and-groove connection the auxiliary jaw is firmly held and when said jaw is removed, the holding bolt or bolts of the tool carriage may be inserted therein.

The central downwardly extending portion 22 of the frame 12 is provided with a passage in which a threaded shaft 23 is longitudinally guided while being held from revolution by a suitable key or spline and there is splined to it a beveled gear 24 supported by the frame in such position that it meshes with both of the beveled pinions 16 and 17. This shaft 23 carries a head 25 formed with a plane top face lying at right angles with the planes of the adjacent faces of the two jaws 18 and 19.

Under conditions of use a roll, shaft, or other cylindrical body to be turned would be provided with a central hole or recess at that end which is to be engaged by the jaws or dog of the face plate 6 of the lathe. The roll would then be lowered over the lathe body and adjusted until the center 7 entered said hole, the roll at this time preferably having its opposite end somewhat higher than this centered end and extending between the jaws 18 and 19. These latter would then be simultaneously moved toward each other by revolution of the hand wheel 15, it being obvious that such revolution would be transmitted from the screw 13 through the pinion 16, gear 24 and pinion 17 to the threaded shaft 14. When the cylindrical surface of the roll is engaged by the plane faces of both jaws it is lowered until it rests upon the head 25 of the threaded shaft 23, and the various parts of my invention are so adjusted that under these conditions the roll or shaft is positively centered. The jaws 10 may now be adjusted to bring them into gripping engagement with the roll, after which the hand wheel 15 may be rotated in a direction such that the jaws 18 and 19 are moved away from the roll and the auxiliary jaw 20 replaced by a tool holder and tool by which the turning operation may be carried out.

From the above description it will be noted that the centering of even the heaviest structures may be accomplished in an exceedingly short time and with a degree of accuracy depending only upon the perfection of the construction of apparatus constituting my invention. Thereafter by moving back the member 18 and mounting a suitable tool thereon, the roll or other piece of work may be turned in the well known manner.

I claim:—

1. The combination in a centering device of a supporting frame open at the top; two jaws mounted on the frame and movable horizontally toward and from each other; mechanism connecting the jaws; with a centering head actuated by said mechanism and placed to support an object mounted between said jaws.

2. A combination in a centering device of a supporting frame open at the top; two jaws mounted thereon and movable horizontally toward and from each other; mechanism for simultaneously moving said jaws including gearing; and a centering head placed to support an object entered between the jaws and movable by said gearing in a line at right angles to the line of movement of said jaws.

3. The combination in a centering device of a supporting structure; three centering members thereon; and means for simultaneously moving said members consisting of three intermeshing gears, threaded spindles rigidly fixed to two of said gears and threaded in two of the members respectively; with a threaded spindle attached to the third member and threaded through the third gear.

4. The combination in a lathe centering device of a supporting frame open at the top; jaws mounted thereon and movable in the same horizontal line; a centering head carried by the frame and movable in a line at right angles to the line of movement of the jaws, said head being placed to support an article entered between the jaws; with means for simultaneously moving the jaws and the centering head.

5. The combination in a centering device of a supporting frame; two jaws slidably mounted thereon; shafts threaded respectively through said jaws; gears respectively connected to said shafts; a third gear rotatable in a plane at right angles to the plane of the other shafts and jaws; a centering head; with a third shaft threaded through the third gear and carrying said centering head.

6. The combination in a lathe centering device of a supporting frame; two jaws slidably mounted thereon; threaded shafts respectively connected to said jaws; a beveled gear on each of said shafts; a third beveled gear operatively connecting said shaft-carried gears; a third shaft threaded through said third gear; and a centering head carried by said third shaft.

7. The combination in a lathe centering device of a frame; two threaded shafts mounted in bearings on said frame and extending in substantially the same straight line; jaws slidable on the frame and having threaded portions engaging said shafts respectively; beveled gears respectively connected to the said shafts; a third beveled gear connecting said shaft carried gears; a third threaded shaft carried by the frame and splined to the third beveled gear; a centering head carried by the third shaft; and means for simultaneously turning said shafts at will.

8. The combination in a centering device of a supporting frame; two jaws mounted on the frame and movable toward and from each other; mechanism connecting the jaws; and a centering head actuated by said mechanism, one of said jaws consisting of a main and auxiliary portion and said auxiliary portion being removable.

9. The combination in a centering device of a supporting frame; two jaws mounted on the frame and movable toward and from each other; mechanism connecting the jaws; and a centering head actuated by said mechanism, one of said jaws consisting of a main portion having an under-cut slot, with an auxiliary portion having a headed lug fitting said slot and formed with a plane face continuous with a plane face of said main portion of the jaw.

In testimony whereof, I have signed my name to this specification, in the presence of two subscribing witnesses.

ALFRED CROOK.

Witnesses:
WILLIAM E. BRADLEY,
WM. A. BARR.

Copies of this patent may be obtained for five cents each, by addressing the "Commissioner of Patents, Washington, D. C."